(12) United States Patent
Chien et al.

(10) Patent No.: US 7,283,685 B2
(45) Date of Patent: Oct. 16, 2007

(54) DEVICE THAT APPENDS A RECOGNITION POINT FOR IMAGE JOINING TO THE EXTRACTED IMAGE AND A RECOGNITION ELEMENT THEREOF

(75) Inventors: Shih-Hung Chien, Hsinchu (TW); Ping-Jung Fan, Hsinchu (TW)

(73) Assignee: Microtek International Inc., Hsinchu (TW)

( * ) Notice: Subject to any disclaimer, the term of this patent is extended or adjusted under 35 U.S.C. 154(b) by 941 days.

(21) Appl. No.: 10/667,431

(22) Filed: Sep. 23, 2003

(65) Prior Publication Data
US 2005/0063609 A1 Mar. 24, 2005

(51) Int. Cl.
*G06K 9/36* (2006.01)
*G06K 9/46* (2006.01)

(52) U.S. Cl. ................................... 382/287
(58) Field of Classification Search ............. 382/173, 382/190, 276, 277, 287, 289, 294, 296, 318
See application file for complete search history.

(56) References Cited

U.S. PATENT DOCUMENTS 5,201,011 A * 4/1993 Bloomberg et al. ......... 382/175
5,384,863 A * 1/1995 Huttenlocher et al. ...... 382/173
5,883,986 A * 3/1999 Kopec et al. ............... 382/310
2005/0063609 A1* 3/2005 Chien et al. ................ 382/287
2005/0111051 A1* 5/2005 Uchikawa ................... 358/448

* cited by examiner

*Primary Examiner*—Amir Alavi
(74) *Attorney, Agent, or Firm*—Rosenberg, Klein & Lee

(57) ABSTRACT

The invention provides a device that appends a recognition point for image joining to the extracted image and a recognition element thereof. The device is to provide a plurality of holding slots on a holding platform. Besides, a plurality of positioning slots is provided at the sidewall of each holding slot so that the holding slot can accommodate and fasten an object to be image-taken. Then, when the image of the object is extracted by the segmented extractions, the image of the positioning slot can also be extracted so as to obtain an image with a recognition mark. Thus, the recognition mark can be used as a benchmark for image joining in order to obtain a whole image of the object. Moreover, the recognition element is to provide a positioning opening concavely at the side edge of a sheet-body, and the positioning opening is tiny. Therefore, the invention can achieve an effect of easy, rapid, and precise image joining.

20 Claims, 12 Drawing Sheets shifting and rotating for overlapping the openings

DEVICE THAT APPENDS A RECOGNITION POINT FOR IMAGE JOINING TO THE EXTRACTED IMAGE AND A RECOGNITION ELEMENT THEREOF

BACKGROUND OF THE INVENTION

1. Field of the Invention

The invention relates to a device applied to image extractions and, more particularly, to a device that appends a recognition mark to an extracted image so that the recognition mark can be used as a referential benchmark for image alignment when joining images.

2. Description of the Related Art

To scan an image of raw data (such as a photograph, a negative, or a slide) by a scanner or to take a picture of the data by a digital camera and make the image or the picture into an image file has become a common method for digital filing and archiving.

On the other hand, in respond to a specific scanning of a light transmitting film—for instance, a positive film, a negative film, or a slide film—a platform scanner and a film scanner have been introduced for use. Particularly, these scanners can see through an object and scan various films. Among these scanners, the film scanner is designed for scanning a 35 mm positive film and negative film. As shown in FIG. 1, the film scanner is provided with a film holder 10 that is further provided with a plurality of accommodating slots 12 for accommodating the object to be scanned. When taking a picture, first, the object 14 to be scanned is placed inside the accommodating slots 12 of the film holder 10, and then the film holder 10 will be sent into a film input device for scanning through the sides of the scanner.

However, the situation may be that the dimension of the object 14 to be scanned—for example, a photograph, a negative, or a transparent glass-slide for medical use—is larger than the dimension that a scanner can scan. For this reason, as shown in FIG. 2, the user of the scanner has to do segmented scanning on the object 14 and then join all the segmented images together. If, however, the image-joining technique is not good enough, the finished image cannot be perfect. In fact, it is very likely to get two overlapping images with poor alignment, as shown in FIG. 3.

On the other, even though software for image joining instead of the aforementioned manual joining technique can be applied, the user of the scanner still has to find a joining point for each segmented image on a computer screen to join all the segmented images. Usually, it needs to take tens of minutes to finish the joining job, followed by a polishing job that has to be done for a perfect joining. Therefore, the whole joining process is not only tedious but time consuming.

Focusing on the above-mentioned problem, the invention provides a device that appends a recognition point for image joining to the extracted image and a recognition element used by the device. Through them, a specific mark can be added into each segmented image as a referential benchmark for image alignment during the image joining.

SUMMARY OF THE INVENTION

The main and first object of the invention is to provide a device that appends a recognition point for image joining to an extracted image obtained from segmented image extractions so that a clear and identifiable positioning mark can be automatically appended to the extracted image, and that the positioning mark can be used as a referential benchmark for image alignment during the image joining, thereby obtaining a rapid and precise image joining as well as resolving the conventional problem of poor image joining.

The second object of the invention is to provide a recognition element that utilizes a tiny opening thereon to offer a more delicate recognition mark for joining.

The third object of the invention is to employ the recognition mark appended to the image to join the segmented images smoothly as well as restore a whole image.

According to the invention, a device that appends a recognition point for image joining to the extracted image includes a holding platform and a plurality of holding slots provided thereon for accommodating and fastening the object to be image-taken. Besides, a plurality of positioning slots is provided at the side face of each holding slot so that when the image of the object is extracted during the segmented extractions, the image of the positioning slot can be extracted and an image with a recognition mark can be obtained. By doing so, the recognition mark can be used as a benchmark for image joining to obtain a whole image of the object. In addition, the invention also provides a recognition element with a positioning opening located at the side edge of a sheet-body so as to provide a tiny recognition opening for the image joining.

The objects and technical contents of the invention will be better understood through the description of the following embodiments with reference to the drawings.

DETAILED DESCRIPTION OF THE PREFERRED EMBODIMENTS

The invention is to automatically append an recognition mark to each extracted image when the image of an object is extracted by segmented extractions so that the recognition mark can be used as a referential benchmark for alignment during the image joining, and that the segmented images can be joined together rapidly and precisely according to the referential benchmark.

Figure 1:
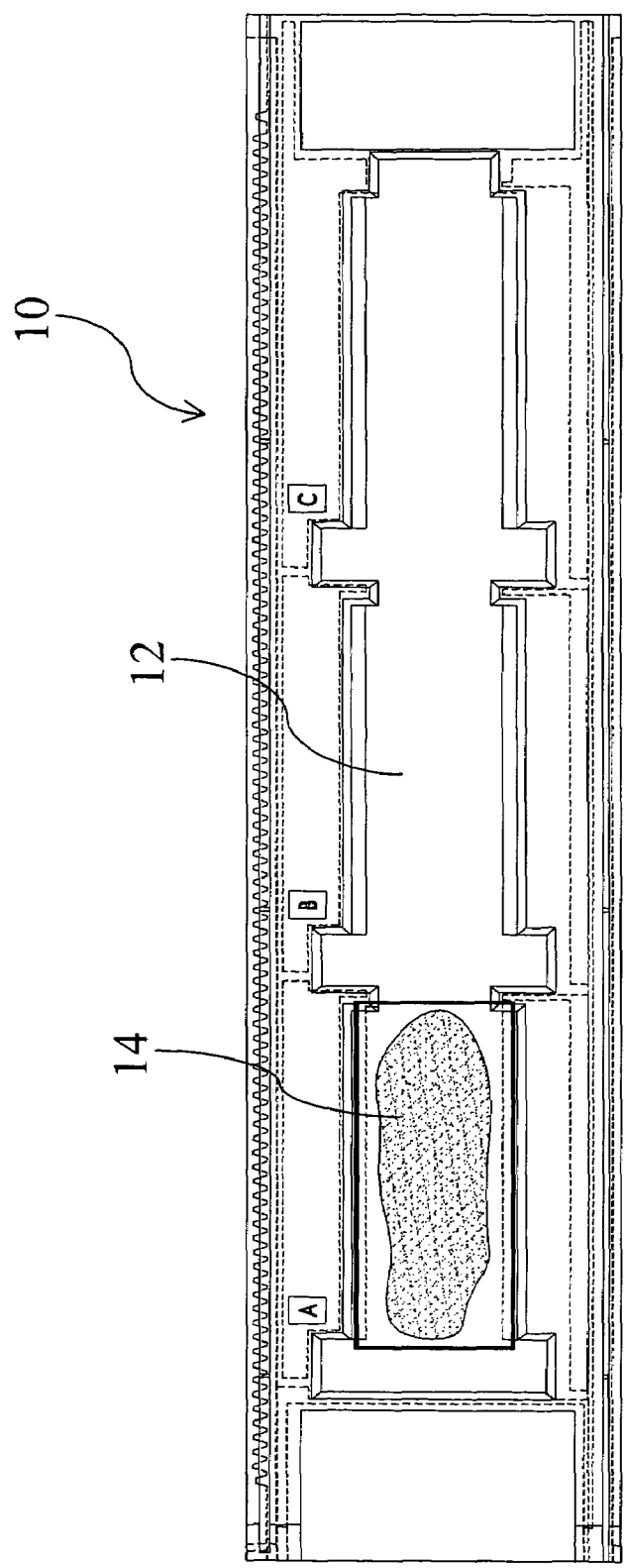
FIG. 1 is a schematic diagram showing the structure of a conventional film holder of a scanner.
Figure 2:
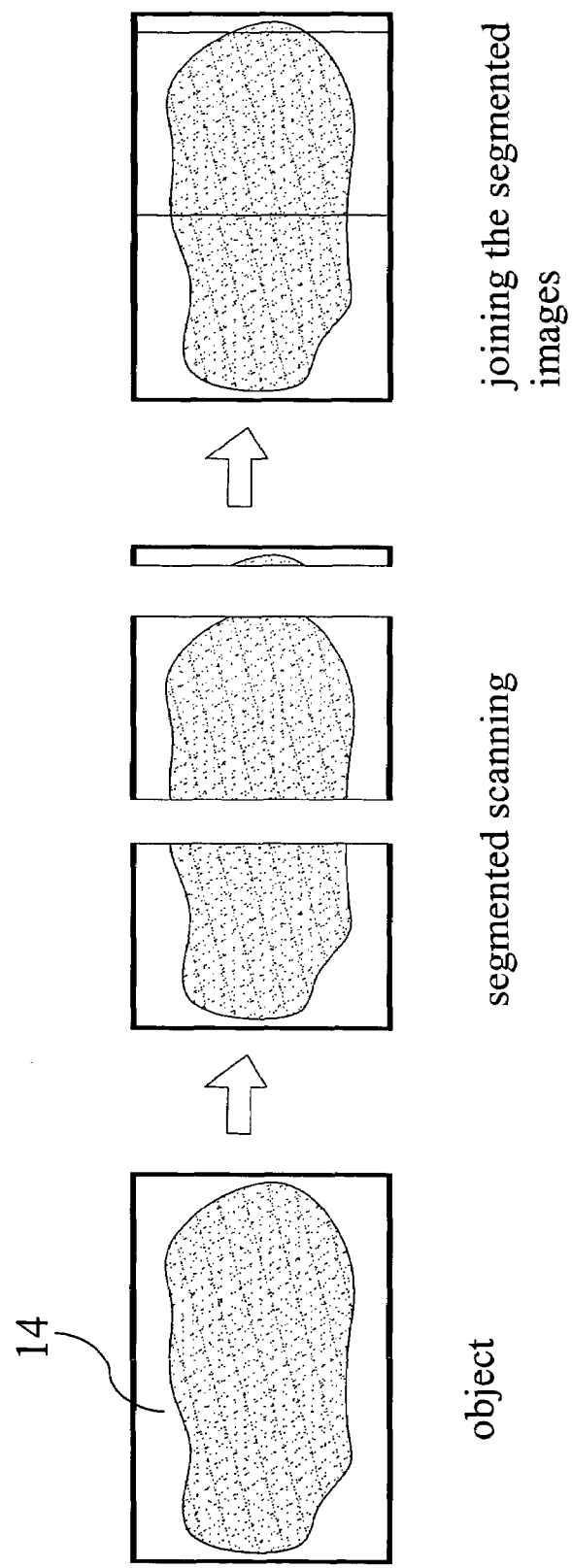
FIG. 2 is a schematic diagram showing a conventional method of joining the scanned images of an object extracted by segmented extractions.
Figure 3:
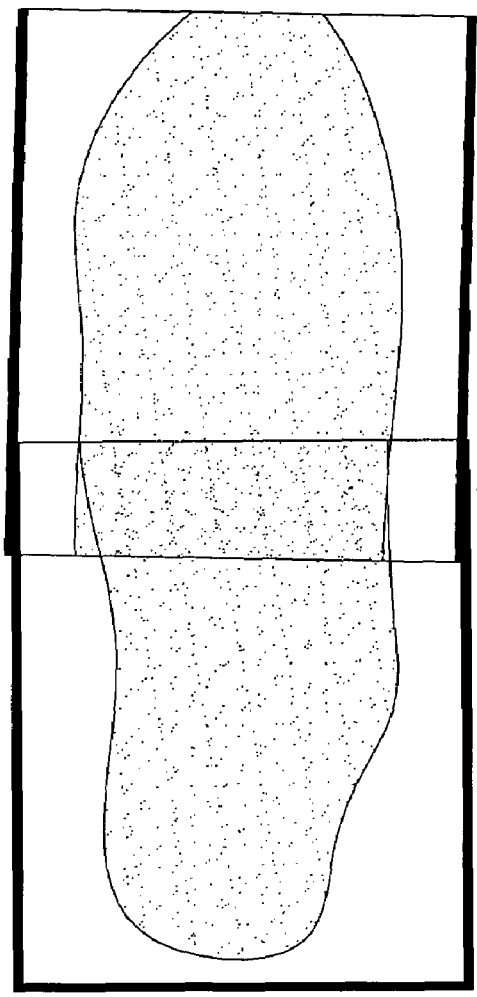
FIG. 3 is a schematic diagram showing two conventional segmented images are poorly joined together.
Figure 4:
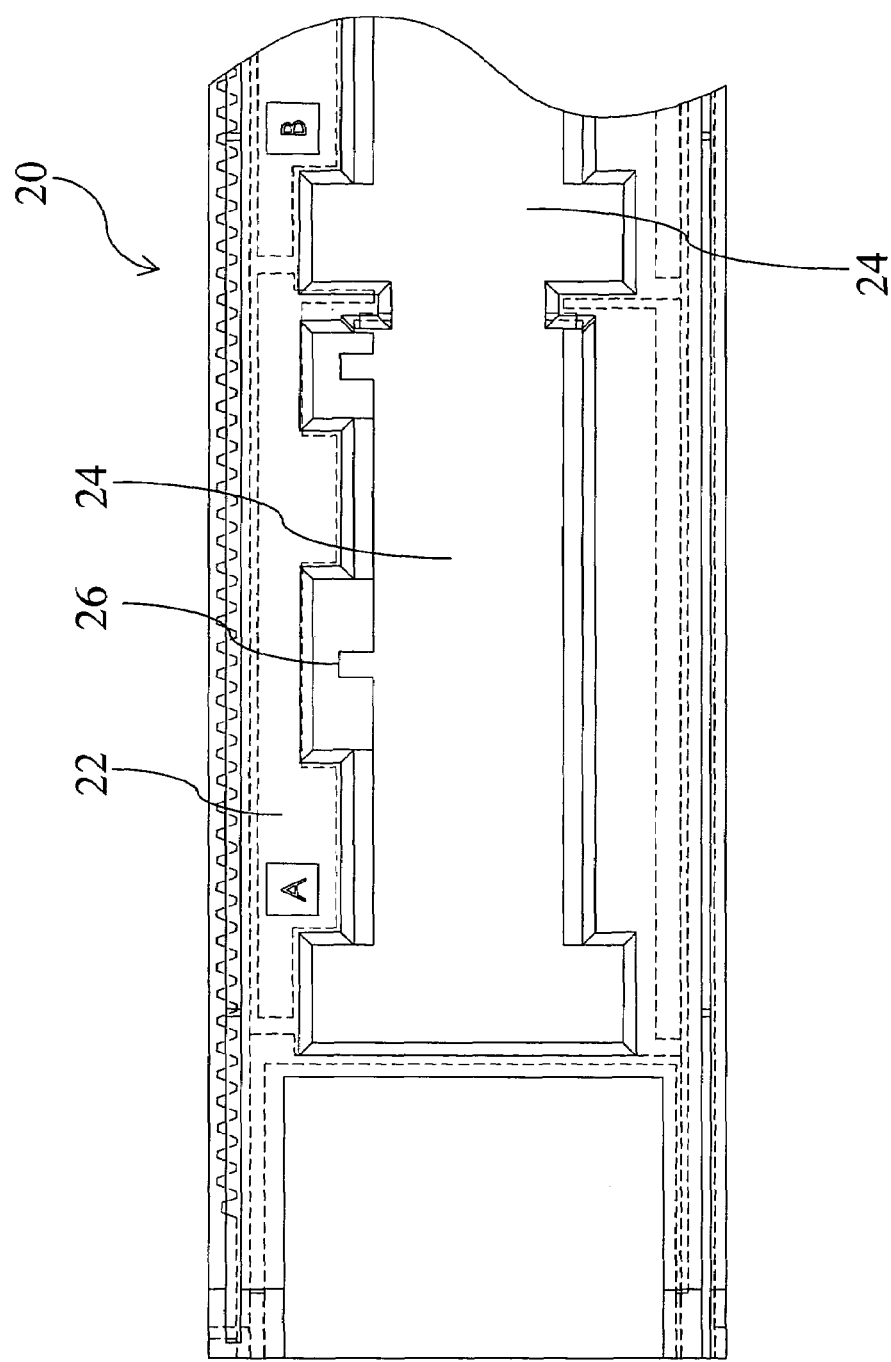
FIG. 4 is a schematic diagram showing the structure of the image-extraction holding device of the invention.
Figure 5:
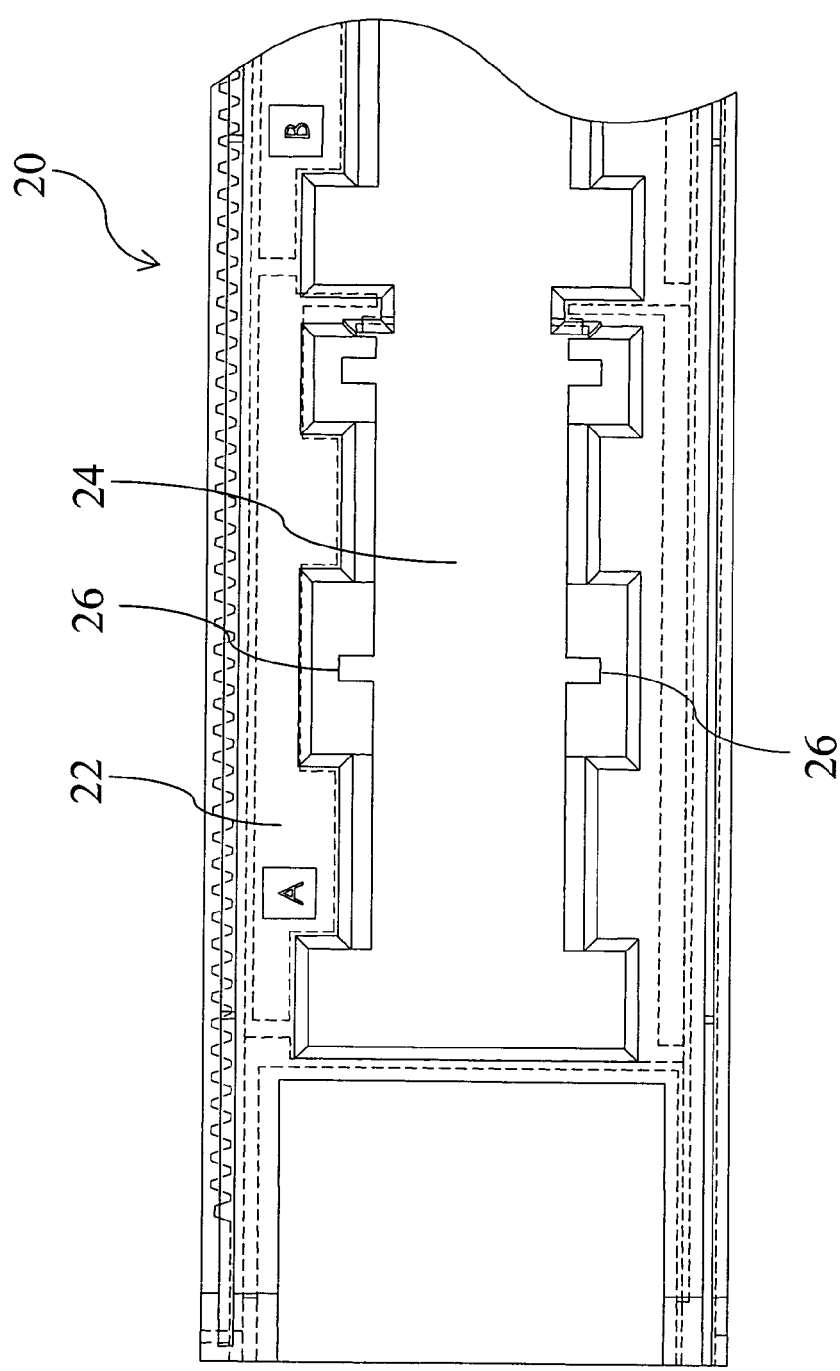
FIG. 5 is a schematic diagram showing another embodiment of the image-extraction holding device of the invention.

To implement the recognition mark appending operation, the invention allows the recognition mark for image joining to be directly formed in an opening shape on the image-extraction holding device, as shown in FIG. 4. FIG. 4 is a schematic diagram showing the structure of the image-extraction holding device of the invention. Referring to FIG. 4, an image-extraction holding device 20 is to provide a plurality of holding slots 24 on a holding platform 22. Each holding slot 24 is for accommodating and fastening the object to be image-taken. Besides, two positioning slots 26 are provided at one sidewall of each holding slot 24, and the positioning slot 26 is an n-shaped opening. In addition, the image of the positioning slot 26 can be extracted when the image of an object is extracted by segmented extractions. Thus, an identifiable n-shaped positioning mark can be obtained as a referential benchmark for image joining. Alternatively, as shown in the embodiment of FIG. 5, the image-extraction holding device 20 of the invention can also uniformly provide two positioning slots 26 on each of the two opposite sidewalls of the holding slot 24. When a position-shifting difference exists between the images extracted through segmented extractions, the marked images of the positioning slots 26 at one sidewall of the holding slot 24 will be used as the benchmark for joining. On the other hand, when the position-shifting difference and the angle difference all exist between the extracted images through segmented extractions, the marked images of the positioning slots 26 at the two sidewalls of the holding slot 24 will be used as the benchmarks for joining.

Figure 6:
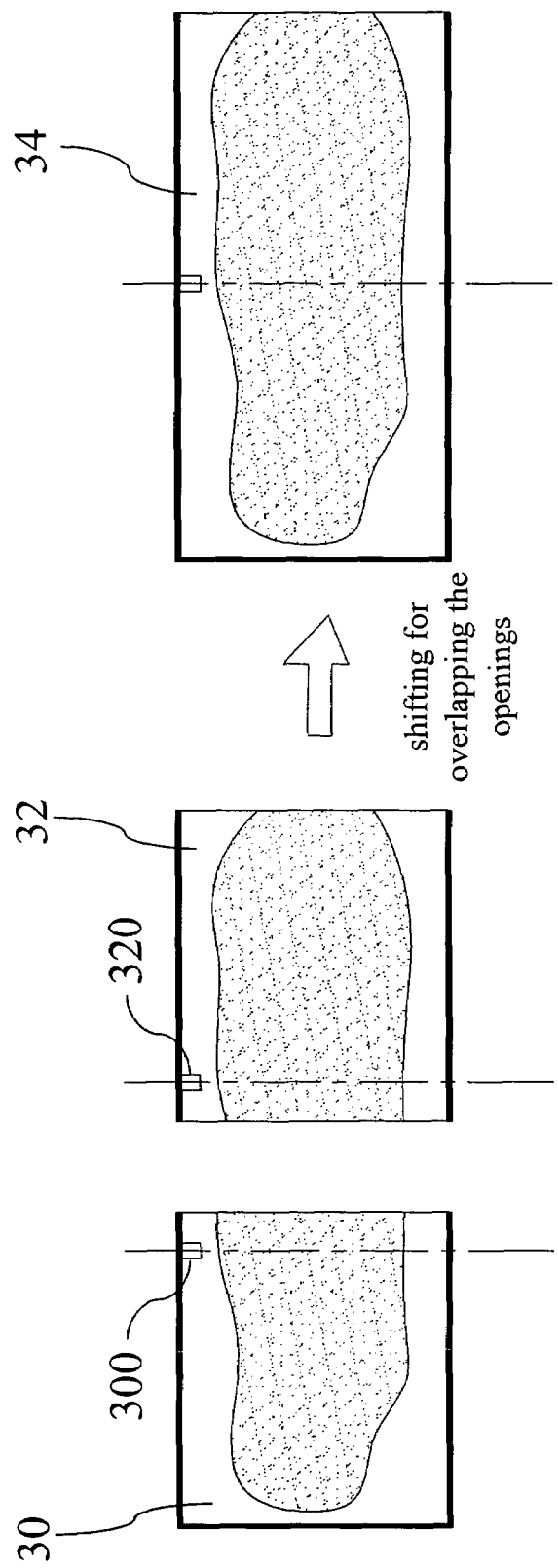
FIG. 6 is a schematic diagram showing the segmented images illustrated in FIG. 4 are joined together.

Also, the method for extracting the image of an object is usually to employ a scanner for scanning or a camera for photographing. Among them, the scanning method is used more often. Therefore, the following functioning principles and operation method of the image-extraction holding device 20 will be illustrated by using the scanning method. First, after an object to be segmented scanning has been placed inside the holding slot 24 of the image-extraction holding device 20, as shown in FIG. 4, the image-extraction holding device 20 will be placed inside a film scanner for segmented scanning. During the scanning, the light will pass through the opening of the positioning slot 26, and because of the contrast between black and white, a recognition mark in the shape of the positioning slot 26 will be formed on the scanned image, as shown in FIG. 6. Therefore, each of the two n-shaped recognition marks 300 and 320 will be formed on each of the two consecutively scanned images 30 and 32 respectively through segmented scanning. In addition, because there exists only one position-shifting difference between the two consecutively scanned images 30 and 32, the n-shaped recognition marks 300 and 320 at the same sidewall will be used as referential benchmarks for joining. Therefore, the two images 30 and 32 will be shifted so that the recognition mark 300 of the formerly scanned image 30 can be aligned with the recognition mark 320 of the latterly scanned image 32 for an overlapping. Through the overlapping made by the two recognition marks 300 and 320, the two consecutively scanned images 30 and 32 can be precisely joined together so as to obtain a perfectly joined image 34.

Figure 7:
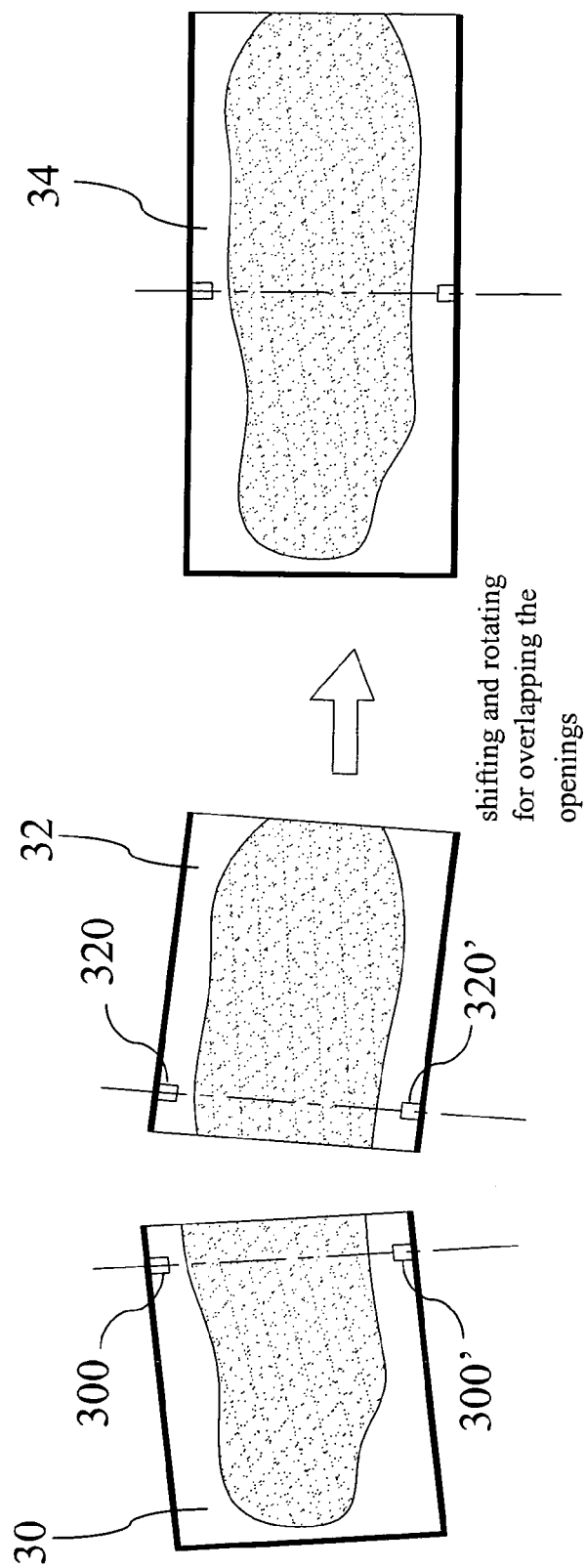
FIG. 7 is a schematic diagram showing the segmented images illustrated in FIG. 5 are joined together.

In the same way, as shown in FIG. 5 illustrating the image-extraction holding device 20, it should be noted that since the positioning slot 26 is provided on each of the two opposite sidewalls of the holding slot 24, an n-shaped recognition mark will be formed on each of the two opposite sides of the scanned image for a shifting joining and a rotating joining after the scanning. Then, as shown in FIG. 7, in addition to the position-shifting difference between the two consecutively scanned images 30 and 32, an angle difference also exists between the two. In this case, the two opposite n-shaped recognition marks 300 and 300' on the formerly scanned image 30 and the two opposite n-shaped recognition marks 320 and 320' on the latterly scanned image 32 will be used as the referential benchmarks for joining. Hence, through the benchmarks, the two consecutively scanned images 30 and 32 will perform the shifting and rotating so that the recognition marks 300 and 300' at the two sides of the formerly scanned image 30 will be aligned with the recognition marks 320 and 320' respectively at the two sides of the latterly scanned image 32 for an overlapping. Thus, the two consecutively scanned images 30 and 32 can be precisely joined together to obtain a perfectly joined image 34.

In particular, the object applied for the image-taking operation in the invention is usually the one that the light can pass through, which, for instance, can be a photograph, a positive film, a negative film, a slide, a projection, or a transparent glass-slide. The example of a transparent glass-slide can be either a cell slice or a biological chip for medical use.

Figure 8:
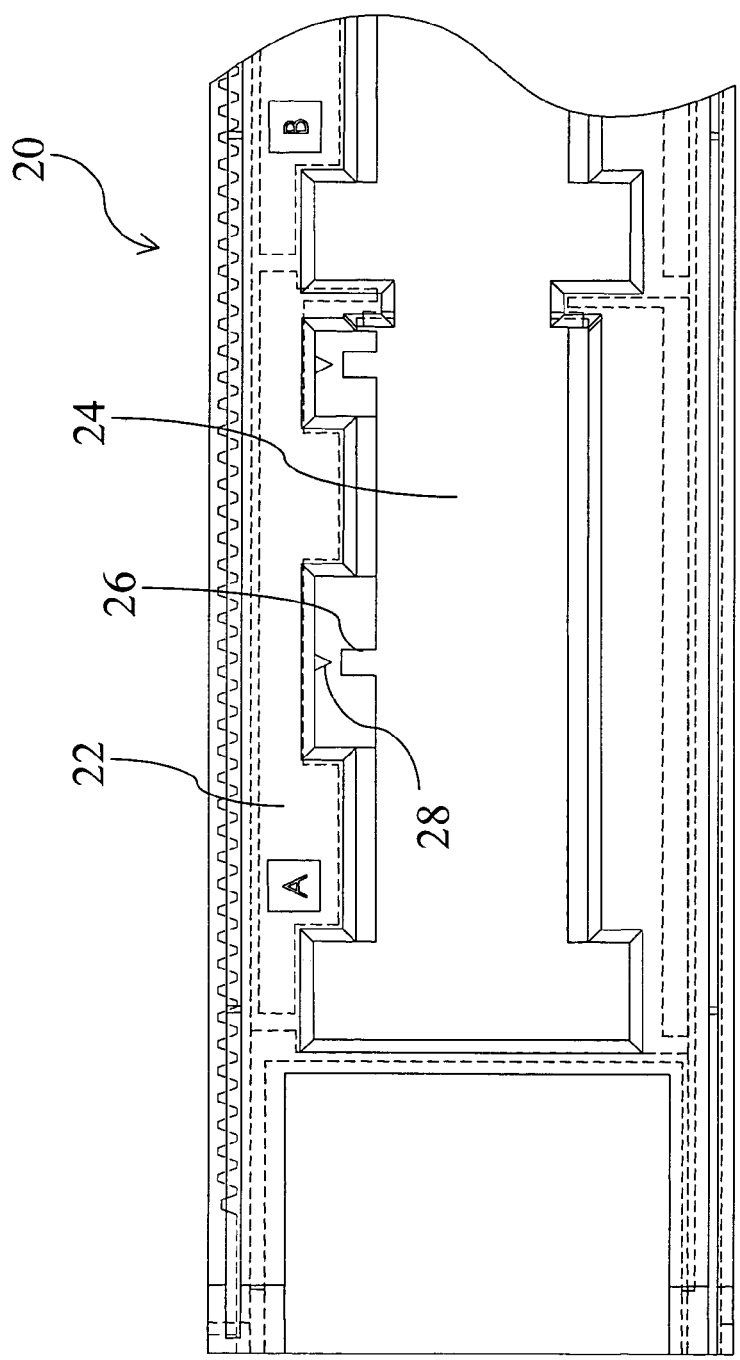
FIG. 8 and FIG. 9 are two schematic diagrams showing two more different embodiments for the image-extraction holding device of the invention.

Furthermore, in order to achieve a better aligning effect of image joining, as shown in another embodiment in FIG. 8, the invention will add in a v-shaped slot 28 at the outer side of the bottom of the single-sided positioning slot 26. The tip of the v-shaped slot 28 is used as a positioning point, and when the scanning light passes through the v-shaped slot 28, the v-shaped mark will be formed on the scanned image. Because the tip can provide a function of fast positioning, the positioning point at each of the two consecutively scanned images can be aligned for a fast positioning as well as a preliminary overlapping. After that, the n-shaped positioning slots 26 can be used for a more precise overlapping so as to finish the joining job and form a perfect image of the object.

Figure 9:
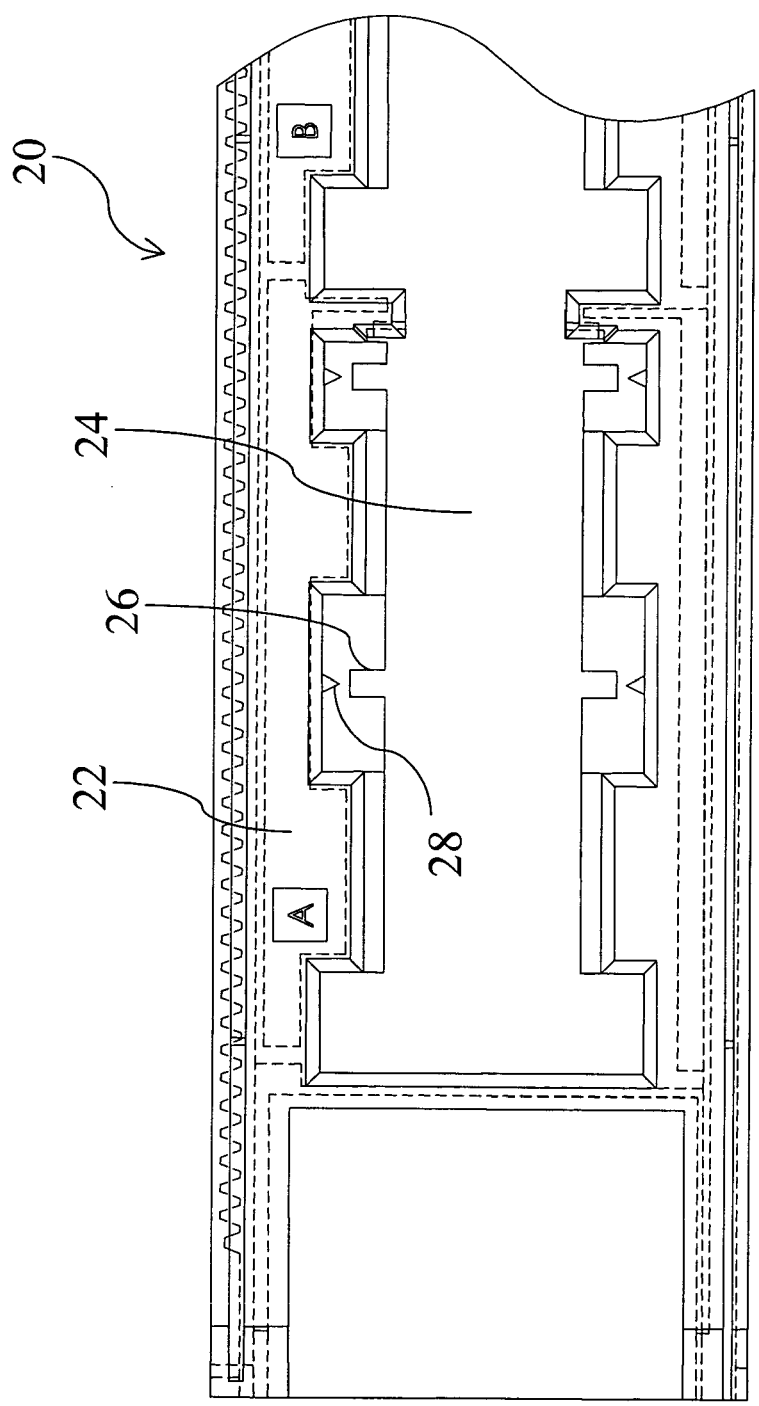

By the same token, the positioning-point design can also be added into the embodiment in FIG. 5 to form another aspect of the embodiment shown in FIG. 9, which is a design that appends a v-shaped slot 28 to the double-sided positioning slot 26.

In the invention, by utilizing a method that directly forms a recognition mark for joining in an opening shape on the image-extraction holding device, the recognition mark can be naturally formed on each segmented image. Therefore, the recognition mark can be used as a referential benchmark for image joining. Meanwhile, the entire image of the object can be restored, and the image joining can be carried out rapidly and precisely as well.

Figure 10B:
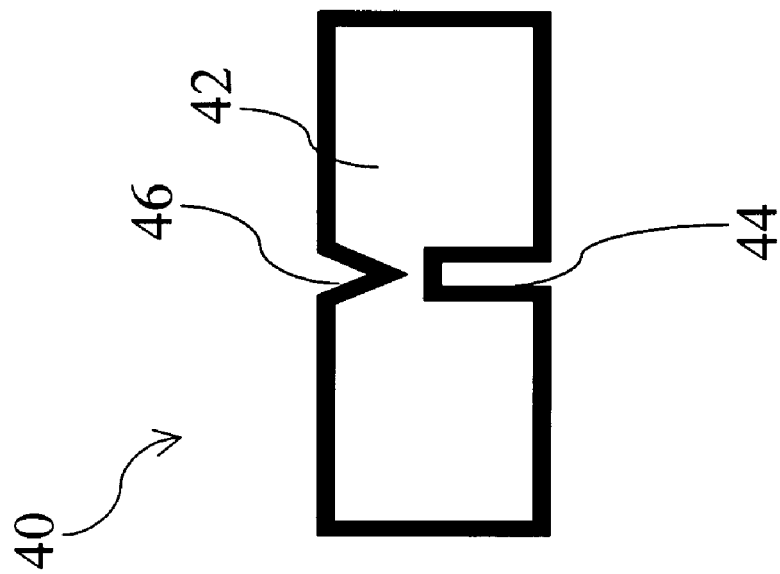
FIG. 10A and FIG. 10B are two schematic diagrams showing two embodiments for the recognition element of the invention.
Figure 10A:
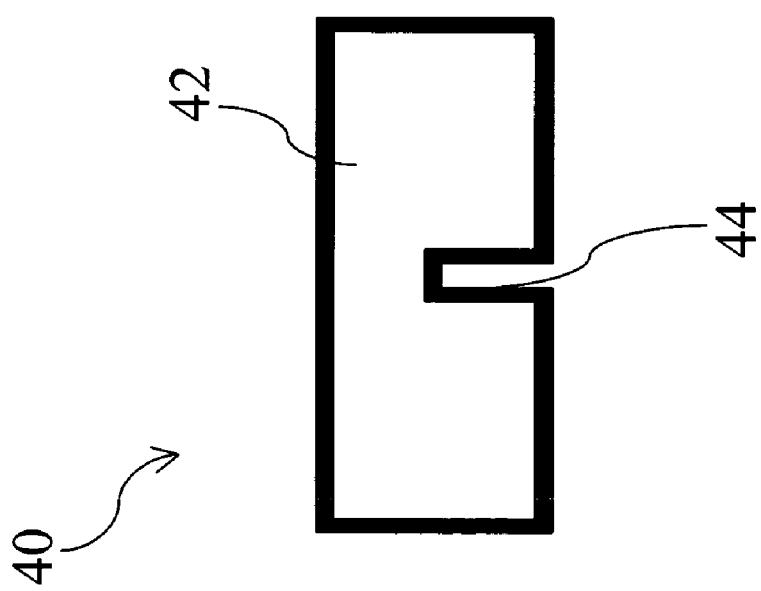

In addition to the positioning slot 26 and the positioning point provided on the image-extraction holding device 20, the invention further provides a recognition element for a more precise image joining. As shown in FIG. 10A, the recognition element 40 can include an n-shaped positioning opening 44 concavely provided on the side edge of a sheet-body 42. Or, alternatively, as shown in FIG. 10B, a positioning opening 44 and a v-shaped notch 46 can be separately provided on the opposite sides of the sheet-body 42. Specifically, the functions of the positioning opening 44 and the v-shaped notch 46 are the same as those of the positioning slot 26 and the v-shaped slot 28 on the image-extraction holding device 20. The purpose of providing the recognition element 40 is that the recognition element 40 has a sheet-body that is easy to be formed; therefore, it will be easy to make a more delicate opening on the recognition element. And when the recognition element 40 is placed inside the image-extraction holding device 20 for use, the recognition element 40 can provide a more precise joining effect.

Figure 11:
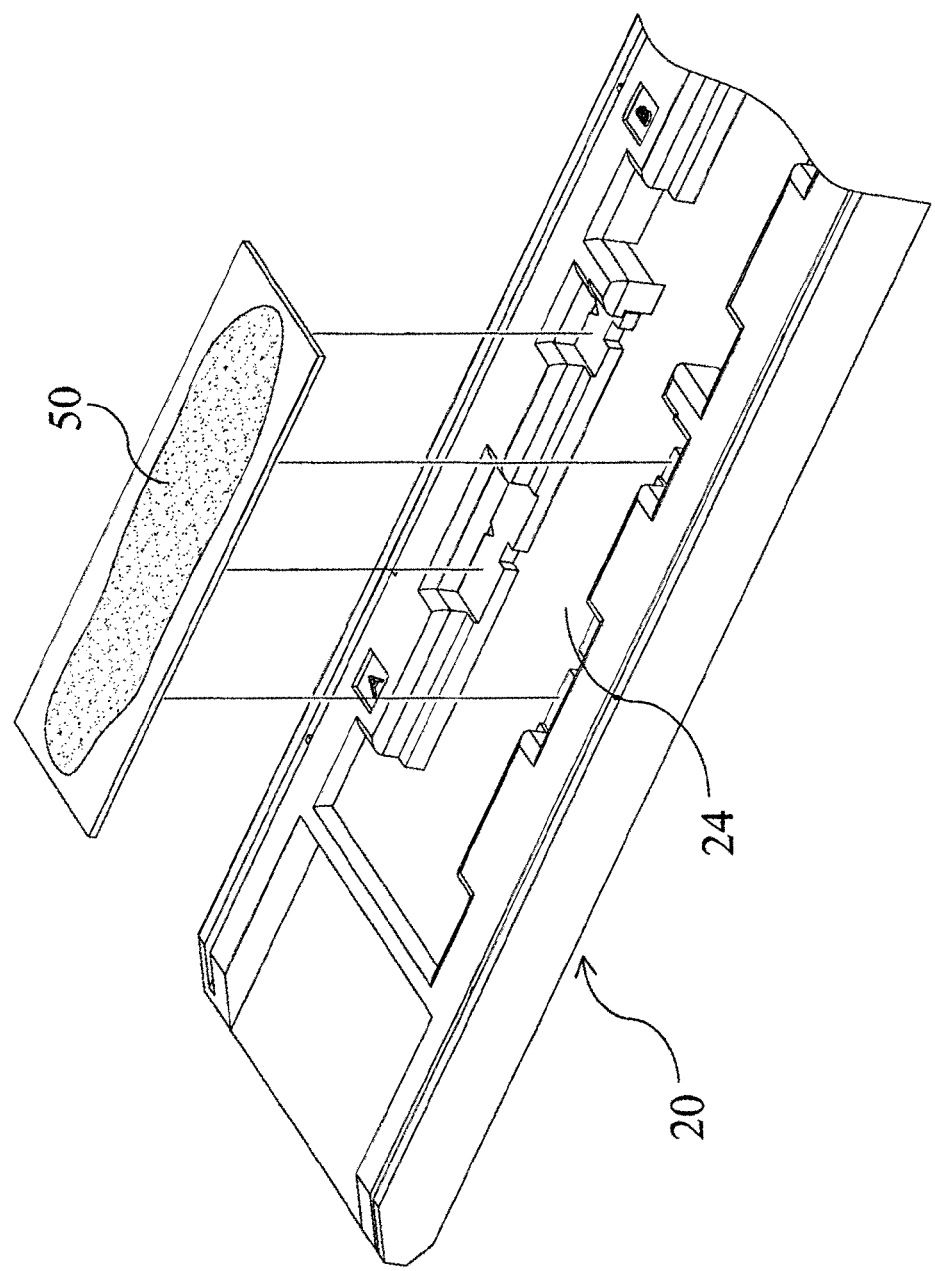
FIG. 11 is a schematic diagram showing that the image-extraction holding device of the invention is solely used.
Figure 12:
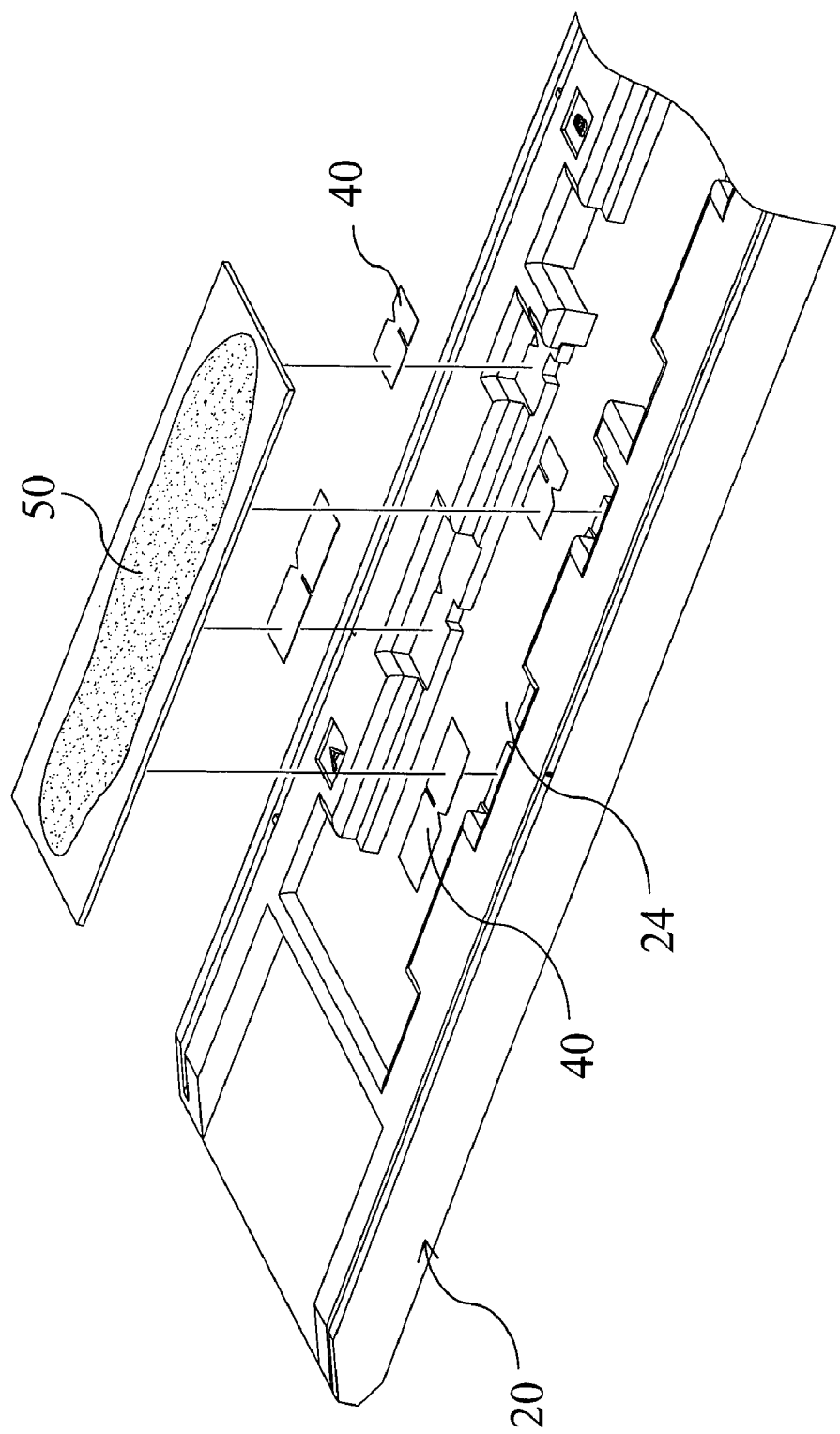
FIG. 12 is a schematic diagram showing that the image-extraction holding device and the recognition device of the invention are working together.

Thus, as shown in FIG. 11, when performing an image scanning, the image-extraction holding device 20 with a desired opening can be employed solely. It means that the only thing needs to be done is directly put the object 50 to be scanned into the holding slot 24 of the image-extraction holding device 20 for scanning. Alternatively, a recognition element 40 can be added in for scanning, as shown in FIG. 12, which means that four recognition elements 40 will be installed into the image-extraction holding device 20 and then an object 50 to be scanned will be placed into the device 20 for scanning.

The aforementioned image-joining operation that utilizes the opening-shaped recognition mark as a referential benchmark is suitable for a manual joining. At the same time, a computer can be used for joining by applying image-processing software. Also, because the invention makes it possible to form a clear and identifiable referential benchmark on the segmented images, it is easy to join the segmented images smoothly.

In conclusion, by forming an opening on the image-extraction holding device as well as providing a recognition element with a tiny opening, the invention can form a recognition mark on each of the segmented images and use the recognition mark as a referential benchmark for image alignment during the image joining. By doing so, the segmented images can be joined together rapidly and precisely, and thus an image with seamless joining can be restored in very short time. Hence, the conventional problem caused by tedious, time-consuming joining job for finding image joining points can be resolved completely.

What is claimed is:

1. A device that appends a recognition point for image joining to the extracted image, including:
   a holding platform;
   a plurality of holding slots, located on the holding platform, wherein each holding slot is to accommodate and fasten an object to be image-taken; and
   a plurality of positioning slots, formed at the side face of each holding slot so that when the image of the object is extracted during the segmented extractions, the image of the positioning slot can also be extracted so as to obtain an image with a recognition mark, which can be used as a benchmark for image joining to obtain an entire image of the object.

2. The device that appends a recognition point for image joining to the extracted image as claimed in claim 1, wherein the method for extracting the image of the object is scanning.

3. The device that appends a recognition point for image joining to the extracted image as claimed in claim 1, wherein the method for extracting the image of the object is photographing.

4. The device that appends a recognition point for image joining to the extracted image as claimed in claim 1, wherein the positioning slot is an n-shaped slot.

5. The device that appends a recognition point for image joining to the extracted image as claimed in claim 1, wherein a positioning point is further provided at the periphery of the positioning slot.

6. The device that appends a recognition point for image joining to the extracted image as claimed in claim 5, wherein the positioning point is the tip of a v-shaped slot.

7. The device that appends a recognition point for image joining to the extracted image as claimed in claim 1, wherein the light can pass through the object.

8. The device that appends a recognition point for image joining to the extracted image as claimed in claim 1, wherein the object is selected from a photograph, a positive film, a negative film, a slide, a projection, and a transparent glass-slide.

9. The device that appends a recognition point for image joining to the extracted image as claimed in claim 1, wherein the positioning slots are located on one sidewall of each holding slot.

10. The device that appends a recognition point for image joining to the extracted image as claimed in claim 1, wherein the positioning slots are uniformly located on the two opposite sidewalls of each holding slot.

11. The device that appends a recognition point for image joining to the extracted image as claimed in claim 9, wherein when a position-shifting exists between the extracted images through the segmented extractions, the positioning slots at one sidewall of each holding slot are used as benchmarks for image joining.

12. The device that appends a recognition point for image joining to the extracted image as claimed in claim 10, wherein when the position-shifting difference and the angle difference exist between the extracted images through the segmented extractions, the positioning slots at the two opposite sidewalls are used as benchmarks for image joining.

13. A recognition element, used as a recognition benchmark for image joining, wherein the recognition element is to provide a positioning opening at the side edge of a sheet-body; therefore, when the image of an object is extracted from the segmented extractions, the image of the positioning opening will also be extracted so that an image with a recognition mark can be obtained and used as a benchmark for image joining, thereby obtaining the entire image of the object.

14. The recognition element as claimed in claim 13, wherein the method for extracting the image of the object is scanning.

15. The recognition element as claimed in claim 13, wherein the method for extracting the image of the object is photographing.

16. The recognition element as claimed in claim 13, wherein the positioning opening is an n-shaped opening.

17. The recognition element as claimed in claim 13, wherein a positioning point is provided on the sheet-body as well as located at the side face opposite to the positioning opening.

18. The recognition element as claimed in claim 17, wherein the positioning point is the tip of a v-shaped opening.

19. The recognition element as claimed in claim 13, wherein the light can pass through the object.

20. The recognition element as claimed in claim 13, wherein the object is selected from a group of objects formed by some of the following objects: a photograph, a positive film, a negative film, a slide, a projection, and a transparent glass-slide.

* * * * *